(12) United States Patent
Matsubara et al.

(10) Patent No.: US 9,905,866 B2
(45) Date of Patent: Feb. 27, 2018

(54) FUEL CELL SYSTEM AND FUEL CELL SYSTEM CONTROL METHOD

(71) Applicant: TOYOTA JIDOSHA KABUSHIKI KAISHA, Toyota-shi, Aichi-ken (JP)

(72) Inventors: Yasuo Matsubara, Anjo (JP); Kenji Umayahara, Miyoshi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 344 days.

(21) Appl. No.: 14/938,377

(22) Filed: Nov. 11, 2015

(65) Prior Publication Data
US 2016/0141651 A1    May 19, 2016

(30) Foreign Application Priority Data
Nov. 15, 2014  (JP) .................................. 2014-232249

(51) Int. Cl.
*H01M 8/06* (2016.01)
*H01M 8/04089* (2016.01)
*H01M 8/04746* (2016.01)

(52) U.S. Cl.
CPC ... *H01M 8/04097* (2013.01); *H01M 8/04753* (2013.01); *H01M 2250/20* (2013.01); *Y02T 90/32* (2013.01)

(58) Field of Classification Search
CPC ......... H01M 8/04097; H01M 8/04753; H01M 2250/20; Y02T 90/32
See application file for complete search history.

(56) References Cited

U.S. PATENT DOCUMENTS

| | | | |
|---|---|---|---|
| 7,323,262 B2 * | 1/2008 | Simpson ........... | H01M 8/04231 429/413 |
| 8,435,697 B2 * | 5/2013 | Yoshida ............ | H01M 8/04097 429/512 |

(Continued)

FOREIGN PATENT DOCUMENTS

| | | |
|---|---|---|
| CA | 2 647 868 A1 | 6/2009 |
| JP | 2008-235020 | 10/2008 |

(Continued)

*Primary Examiner* — Raymond Alejandro
(74) *Attorney, Agent, or Firm* — Finnegan, Henderson, Farabow, Garrett & Dunner, LLP

(57) ABSTRACT

A fuel cell system includes a fuel cell containing a unit cell with an anode and a cathode included therein, a hydrogen supply unit that supplies hydrogen gas to the anode, a circulation pump that supplies an anode exhaust gas containing hydrogen that has not been used for power generation by the fuel cell and is discharged from the anode, once again to the anode to circulate the anode exhaust gas, and a controller that controls supply quantity of the hydrogen gas by the hydrogen supply unit as well as rotating speed of the circulation pump. The controller drives the circulation pump so that the rotating speed of the circulation pump approaches an optimum rotating speed of the circulation pump at which a total hydrogen loss quantity becomes a minimum under a specified current value, the total hydrogen loss quantity being a sum of a hydrogen quantity corresponding to an electric power necessary for driving the circulation pump and a hydrogen quantity passing from anode side to cathode side of the fuel cell.

5 Claims, 6 Drawing Sheets

(56) References Cited

U.S. PATENT DOCUMENTS

| | | | |
|---|---|---|---|
| 8,658,325 B2* | 2/2014 | Saeki | H01M 8/04223 |
| | | | 429/431 |
| 8,871,401 B2* | 10/2014 | Naganuma | H01M 8/04029 |
| | | | 429/429 |
| 9,413,021 B2* | 8/2016 | Ohgami | H01M 8/04753 |
| 2009/0075135 A1 | 3/2009 | Nonobe | |
| 2011/0117467 A1 | 5/2011 | Katano | |
| 2012/0301804 A1 | 11/2012 | Wake et al. | |
| 2014/0335435 A1 | 11/2014 | Mizuno et al. | |

FOREIGN PATENT DOCUMENTS

| | | |
|---|---|---|
| JP | 2012-248319 A | 12/2012 |
| JP | 2013-125591 A | 6/2013 |

* cited by examiner

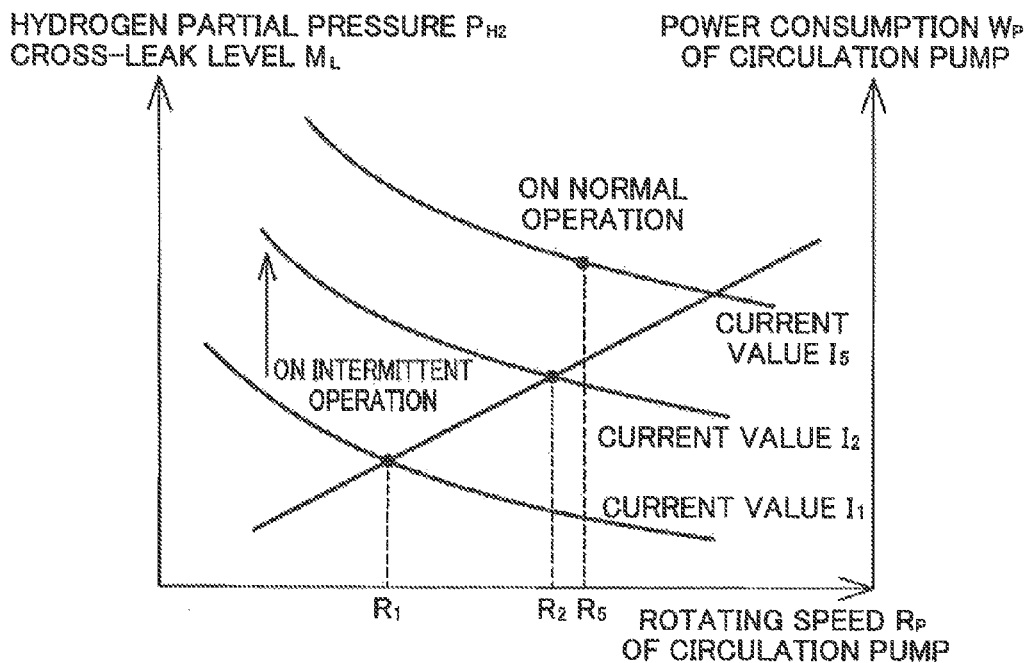
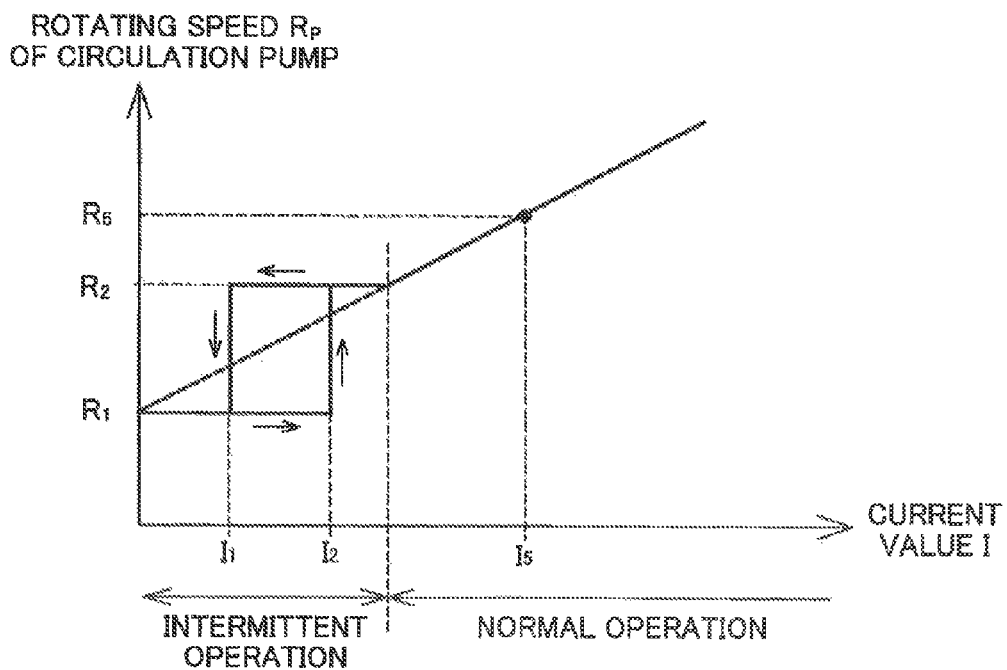

FUEL CELL SYSTEM AND FUEL CELL SYSTEM CONTROL METHOD

CROSS-REFERENCE TO RELATED APPLICATIONS

This application claims priority to Japanese Patent Application No. 2014-232249 filed on Nov. 15, 2014, the entire contents of which are incorporated by reference herein.

BACKGROUND

The present invention relates to a fuel cell system and to fuel cell system control method.

Conventionally, there has been known a fuel cell system in which hydrogen stored in a high-pressure hydrogen tank is supplied to a fuel cell via an injector and moreover in which an anode exhaust gas containing hydrogen that, although once supplied to a fuel cell, has not been used for power generation is circulated by a circulation pump so as to be supplied once again to the fuel cell (JP 2008-235020 A).

It has been desired heretofore that fuel cell systems be improved in power generation efficiency. As one of causes that lead to degradation of the power generation efficiency of fuel cells, there is a case in which hydrogen supplied to the anode permeates through an electrolyte membrane without being used for power generation reaction so as to leak to the cathode side (hereinafter, also referred to simply as 'cross-leak'), with the result that hydrogen is not utilized for power generation but consumed. Particularly in intermittent operations, most of hydrogen supplied from the injector is consumed for the cross-leak, resulting in degraded power generation efficiency. The term, intermittent operation, in this case include to a state of a vehicle with a fuel cell system mounted thereon in which state the power generation of fuel cells is temporarily halted during a low-load operation while electric power is supplied from a secondary battery to a load (vehicle motor or the like), and to a state in which small power generation is executed at an extremely low load during a process of high-potential avoidance control or the like. The low-load operation is exemplified by such a state as an idling state, a low-speed running state or a regenerative braking state. The term, high-potential avoidance, refers to such control that an output voltage of the fuel cell is made to be a high-potential avoidance voltage smaller than an open circuit voltage (OCV) in order to suppress progression of deformation of a catalyst metal contained in the anode or the cathode in above-mentioned intermittent operations.

SUMMARY

The present invention, having been accomplished to solve the above-described problems, can be implemented in the following aspects.

(1) In one aspect of the invention, there is provided a fuel cell system. The fuel cell system comprises: a fuel cell containing a unit cell with an anode and a cathode included therein; a hydrogen supply unit that supplies hydrogen gas to the anode; a circulation pump that supplies an anode exhaust gas containing hydrogen that has not been used for power generation by the fuel cell and is discharged from the anode, once again to the anode to circulate the anode exhaust gas; and a controller that controls supply quantity of the hydrogen gas by the hydrogen supply unit as well as rotating speed of the circulation pump, wherein the controller drives the circulation pump so that the rotating speed of the circulation pump approaches an optimum rotating speed of the circulation pump at which a total hydrogen loss quantity becomes a minimum under a specified current value, the total hydrogen loss quantity being a sum of a hydrogen quantity corresponding to an electric power necessary for driving the circulation pump and a hydrogen quantity passing from anode side to cathode side of the fuel cell. With this constitution, hydrogen quantity consumed by drive of the circulation pump for reduction of the cross-leak can be suppressed while the cross-leak level is reduced. That is, by raising the rotating speed of the circulation pump to increase the circulation quantity of the anode exhaust gas, the hydrogen partial pressure on the anode side of the fuel cell is lowered to reduce the cross-leak level while a hydrogen stoichiometric ratio necessary for generation of a target current value is ensured. On the other hand, by preventing excessive rise in the rotating speed of the circulation pump, the hydrogen quantity consumed by the drive of the circulation pump for reduction of the cross-leak can be suppressed. Thus, the power generation efficiency of the fuel cell can be improved.

(2) In the fuel cell system of the above described aspect, the controller may switch over between normal operation and intermittent operation of the fuel cell, drive the circulation pump at a rotating speed smaller than an optimum rotating speed at which the total hydrogen loss quantity becomes a minimum in the normal operation of the fuel cell, and drive the circulation pump so that the rotating speed of the circulation pump approaches the optimum rotating speed at which the total hydrogen loss quantity becomes a minimum under a specified current value in the intermittent operation of the fuel cell. With this constitution, in the intermittent operation of the fuel cell, the hydrogen quantity consumed by the drive of the circulation pump for reduction of the cross-leak can be suppressed while the cross-leak level is reduced.

(3) In another aspect of the invention, there is provided a fuel cell system control method. The control method comprises the steps of: increasing supply quantity of hydrogen gas with increasing current obtained from a fuel cell in normal operation of the fuel cell; and increasing a flow rate of an anode exhaust gas which is discharged from an anode of the fuel cell so as to be supplied again to the anode as an electric current obtained from the fuel cell increases in intermittent operation of the fuel cell so that a hydrogen partial pressure of the anode is made lower than a hydrogen partial pressure necessary for generating the current in normal operation of the fuel cell. With this constitution, in the intermittent operation, the hydrogen partial pressure on the anode side of the fuel cell can be lowered while a hydrogen stoichiometric ratio necessary for generation of a target current value is ensured. Thus, the power generation efficiency of the fuel cell can be improved.

In addition, the present invention can be implemented in various aspects. For example, the invention can be implemented in such forms as vehicles with the fuel cell system mounted thereon, methods for supplying anode gas to the fuel cell, computer programs for implementing the fuel cell system control method, and recording mediums with those computer programs recorded thereon.

BRIEF DESCRIPTION OF THE DRAWINGS

FIG. 7A is a view for explaining contents of rotating speed control in intermittent operation and normal operation; and FIG. 7B is a view for explaining contents of rotating speed control in intermittent operation and normal operation.

DESCRIPTION OF THE EMBODIMENTS

Figure 1:
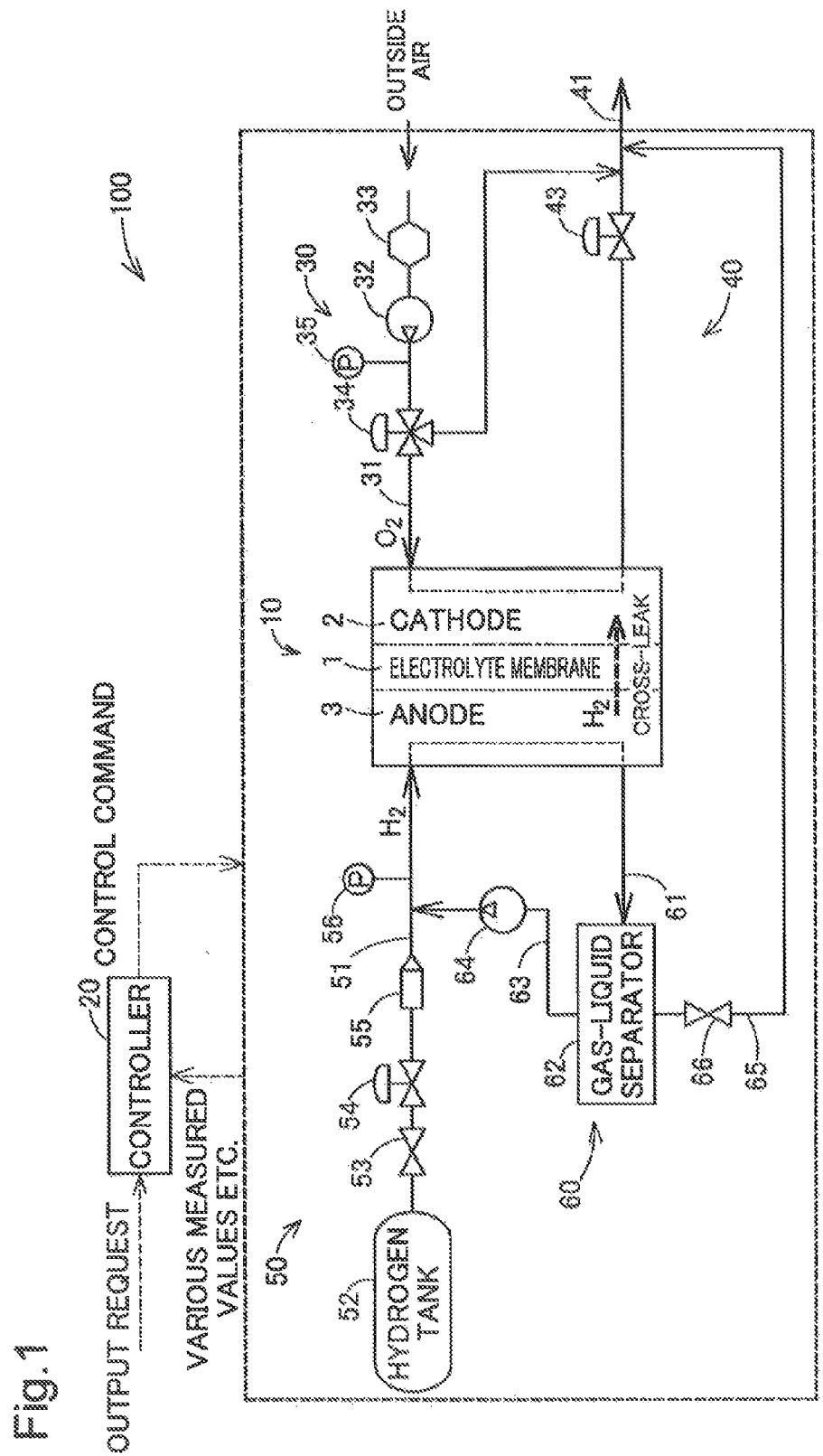
FIG. 1 is a schematic diagram showing a configuration of a fuel cell system.

FIG. 1 is a schematic diagram showing a configuration of a fuel cell system 100 as a first embodiment of the present invention. This fuel cell system 100 is to be mounted, for example, on a fuel cell vehicle to supply electric power to a drive motor, electrical components and the like of the vehicle. The fuel cell system 100 includes a fuel cell 10, a controller 20, a cathode gas supply section 30, a cathode exhaust gas discharge section 40, an anode gas supply section 50, and an anode gas circulation section 60.

The fuel cell 10 is a solid polymer electrolyte fuel cell which is supplied with hydrogen as an anode gas and oxygen as a cathode gas to generate electric power. The fuel cell 10 has a plurality of power generators which are stacked and arrayed in series and which are called unit cells as well. Each unit cell includes a membrane electrode assembly having an electrolyte membrane 1, a cathode 2 placed on one surface of the electrolyte membrane 1, and an anode 3 placed on the other surface of the electrolyte membrane 1. In FIG. 1, one unit cell is shown as the fuel cell 10. The electrolyte membrane 1 is a solid polyelectrolyte membrane which shows successful proton conductivity in a wet state and which is formed from, for example, a fluoric ion-exchange resin. The cathode 2 and the anode 3, which are electrodes having gas diffusivity and electroconductivity, are each made up so as to include a catalytic electrode layer and a gas flow path facing the catalytic electrode layer. The catalytic electrode layer includes a catalyst metal for holding progress of electrochemical reaction and a polyelectrolyte having proton conductivity. The catalytic electrode layer is formed, for example, as a dry film of catalyst ink in which platinum-carrying carbon and a polyelectrolyte identical or similar to the electrolyte membrane 1 are dispersed in a solvent. The gas flow path is formed by, for example, a recessed portion of the separator and an expanded metal. In this case, a gas flow path on the cathode side is referred to also as cathode gas flow path, and a gas flow path on the anode side is referred to also as anode gas flow path.

The controller 20 is implemented by a microcomputer including a CPU (Central Processing Unit) and a main storage unit. The controller 20 accepts a power request from the external, acquires measured values based on output signals derived from various types of sensors within the system, and issues control commands for causing the fuel cell 10 to perform power generation in response to the power request, to various component sections within the system.

The controller 20 controls the individual sections of the fuel cell system 100 to switch over the operating state of the fuel cell 10. More specifically, the controller 20 switches over between normal operation and intermittent operation of the fuel cell 10. The term "normal operation of the fuel cell 10" in this case refers to a state that the fuel cell 10 is enabled to supply generated power to external loads, the state excluding, for example, a halt state, the intermittent operation and the like of the fuel cell 10. The term "intermittent operation of the fuel cell 10" refers to a state that the requested power level for the fuel cell 10 is equal to or lower than a specified value (e.g., a level necessary to execute high-potential avoidance control or the like). In addition, a decision as to whether the intermittent operation is selected is made, without being limited to the requested power level, based on temperature of the fuel cell 10, voltage, hydrogen pressure, and the like.

Generally, fuel cells are subject to occurrence of the so-called cross-leak that hydrogen supplied to the anode is partly allowed to move to the cathode via the electrolyte membrane without being used for the power generation reaction. The controller 20 performs operational control for suppressing the loss quantity of hydrogen in terms of loss quantity (cross-leak level $M_L$) of hydrogen due to the cross-leak and a power consumption $W_P$ required for drive of a later-described circulation pump 64 for reducing the cross-leak level $M_L$ during the intermittent operations of the fuel cell 10. Concrete contents of the control will be described later.

The cathode gas supply section 30 supplies high-pressure air containing oxygen to the cathode 2 of the fuel cell 10. The cathode gas supply section 30 includes a cathode gas pipe 31, an air compressor 32, an air flow meter 33, and a supply valve 34. The cathode gas pipe 31 has one end opened outward of the fuel cell system 100 via an air filter. The cathode gas pipe 31 has the other end connected to an inlet of the cathode gas flow path in the fuel cell 10 via the air flow meter 33, the air compressor 32, the pressure measuring unit 35, and the supply valve 34. The air compressor 32 supplies high-pressure air, which results from compression of outside air taken in via the cathode gas pipe 31 and the cathode gas flow path, to the cathode 2 of the fuel cell 10. The air flow meter 33 measures a quantity of outside air taken in by the air compressor 32 to transmit a measuring result to the controller 20. Based on this measured value, the controller 20 drives the air compressor 32 to control the quantity of air supplied to the cathode 2. The supply valve 34 is provided as a three-way valve to supply high-pressure air fed from the air compressor 32 to the cathode 2 or to downstream of a discharge valve 43 of a later-described cathode exhaust gas pipe 41. The supply valve 34 is opened and closed in response to a pressure of the cathode gas supplied to the cathode 2 to control inflow of the high-pressure air to the cathode 2. The pressure measuring unit 35 measures the pressure of a cathode gas located between the supply valve 34 and the air compressor 32 and transmits a measured value to the controller 20.

The cathode exhaust gas discharge section 40 discharges an exhaust gas (hereinafter, referred to also as 'cathode exhaust gas') containing an unreacted gas, which has not been used for power generation reaction in the cathode 2, as well as generated water components. The cathode exhaust gas discharge section 40 includes the cathode exhaust gas pipe 41 and the discharge valve 43. The cathode exhaust gas pipe 41 has one end connected to an outlet of the cathode gas flow path in the fuel cell 10. The cathode exhaust gas pipe 41 has the other end opened outward of the fuel cell system 100 via the discharge valve 43. The discharge valve 43 adjusts the pressure of the cathode exhaust gas in the cathode exhaust gas pipe 41 (i.e., a back pressure on the cathode 2 side of the fuel cell 10). The discharge valve 43 is adjusted in its degree of opening by the controller 20.

The anode gas supply section 50 includes an anode gas pipe 51, a hydrogen tank 52, an opening/closing valve 53, a regulator 54, a hydrogen supply unit 55, and a pressure measuring unit 56. The anode gas pipe 51 has one end connected to the hydrogen tank 52. The anode gas pipe 51 has the other end connected to an inlet of the anode gas flow path in the fuel cell 10 via the opening/closing valve 53, the regulator 54, the hydrogen supply unit 55, and the pressure measuring unit 56. The hydrogen tank 52 supplies high-pressure hydrogen stored therein to the anode 3 of the fuel cell 10 via the anode gas pipe 51 and the anode gas flow path. The opening/closing valve 53 is opened and closed by a command from the controller 20 to control inflow of hydrogen from the hydrogen tank 52 to the upstream side of the hydrogen supply unit 55. The regulator 54 is a pressure reducing valve for adjusting hydrogen pressure on the upstream side of the hydrogen supply unit 55 and the degree of opening thereof is controlled by the controller 20. The hydrogen supply unit 55 can he implemented by, for example, an injector which is an electromagnetically driven opening/closing valve. The pressure measuring unit 56 measures the pressure of hydrogen on the downstream side of the hydrogen supply unit 55 and transmits a measuring result to the controller 20.

The anode gas circulation section 60 circulates an anode exhaust gas containing an unreacted gas (hydrogen, nitrogen etc.), which has not been used for power generation reaction in the anode 3, to the anode 3 of the fuel cell 10. Also, the anode gas circulation section 60 discharges water and an inert gas contained in the anode exhaust gas from the cathode exhaust gas pipe 41 to outside at a preset timing. The anode gas circulation section 60 includes an anode exhaust gas pipe 61, a gas-liquid separator 62, an anode gas circulation pipe 63, a circulation pump 64, an anode drain pipe 65, and a drain valve 66.

The anode exhaust gas pipe 61 connects the outlet of the anode gas flow path in the fuel cell 10 and the gas-liquid separator 62 to each other to guide the anode exhaust gas discharged from the fuel cell 10 to the gas-liquid separator 62. The gas-liquid separator 62 separates gaseous components and water components, from each other, contained in the anode exhaust gas guided from the anode exhaust gas pipe 61, then guides the gaseous components to the anode gas circulation pipe 63 and guides the water components to the anode drain pipe 65. The anode gas circulation pipe 63 is connected to the anode gas pipe 51 at a point downstream of the hydrogen supply unit 55. The anode gas circulation pipe 63, having the circulation pump 64 provided thereon, delivers out, to the anode gas pipe 51, hydrogen contained in the gaseous components separated in the gas-liquid separator 62 by driving force of the circulation pump 64. The anode drain pipe 65 discharges the water components separated in the gas-liquid separator 62 as well as the inert gas contained in the anode exhaust gas to the cathode exhaust gas pipe 41 at a point downstream of the discharge valve 43. The anode drain pipe 65, having the drain valve 66 provided thereon, is opened and closed in response to a command from the controller 20.

In addition, although their depiction and detailed description are omitted, the fuel cell system 100 mounted on the fuel cell vehicle further includes a secondary battery, and a DC/DC converter for controlling the output voltage of the fuel cell 10 and charging/discharging of the secondary battery. The secondary battery accumulates electric power and regenerative power outputted by the fuel cell 10 to function as a power source together with the fuel cell 10. The above-described individual component sections of the fuel cell system 100 can be driven even after an operation halt of the fuel cell 10 by using the electric power of the secondary battery.

Generally, the cross-leak level $M_L$ is affected by the pressure in the fuel cell. For example, as the hydrogen partial pressure $P_{H2}$ of the anode 3 in the fuel cell 10 decreases, the cross-leak level $M_L$ also decreases. The controller 20 of this embodiment increases the circulation quantity of the anode exhaust gas in intermittent operations of the fuel cell 10 so that the hydrogen partial pressure $P_{H2}$ of the anode 3 in the fuel cell 10 is decreased while a hydrogen stoichiometric ratio necessary for generation of a target current value is ensured. The term, hydrogen partial pressure $P_{H2}$ of the anode in the fuel cell 10, herein means a hydrogen partial pressure inside the anode gas flow path out of the anode 3. The relationship between the circulation quantity of the anode exhaust gas and the hydrogen partial pressure $P_{H2}$ in the intermittent operations of the fuel cell 10 will be described below.

With respect to a theoretical hydrogen quantity $M_N$ (mol/s) necessary for generation of a target current value I during intermittent operations, a hydrogen quantity $M_N^*$ (mol/s) that ensures a hydrogen stoichiometric ratio C (e.g., C≈1.25) satisfies the following Equation (1):

$$M_N^* = C \times M_N = M_N + M_C \tag{1}$$

where $M_C$, which is an additional hydrogen quantity necessary for ensuring the hydrogen stoichiometric ratio C relative to the theoretical hydrogen quantity $M_N$, can be expressed as $M_C = (C-1) \times M_N$.

The theoretical hydrogen quantity $M_N$ is consumed by the electrochemical reaction during power generation. Also, a hydrogen gas flow rate flowing through the anode is equal to an anode-exhaust-gas flow rate $V_{H2}$ (m³/s). Therefore, these additional hydrogen quantity $M_C$ anode-exhaust-gas flow rate $V_{H2}$ and hydrogen partial pressure $P_{H2}$ (Pa) satisfy an equation of state expressed by the following Equation (2):

$$M_C = P_{H2} V_{H2} / RT \tag{2}$$

where R is the gas constant and T is the gas temperature (K) of the anode. It can be understood from Equation (2) that given a constant RT, increasing the anode-exhaust-gas flow rate $V_{H2}$ allows the hydrogen partial pressure $P_{H2}$ necessary for ensuring the additional hydrogen quantity $M_C$ to be decreased. The anode-exhaust-gas flow rate $V_{H2}$ is correlated with the rotating speed $R_P$ of the circulation pump 64 ($V_{H2} = \alpha R_P$, where α is a unit conversion factor). It can be understood from this that increasing the circulation quantity of the anode exhaust gas allows the hydrogen partial pressure $P_{H2}$ to be decreased while the necessary hydrogen stoichiometric ratio C is ensured.

Figure 2:
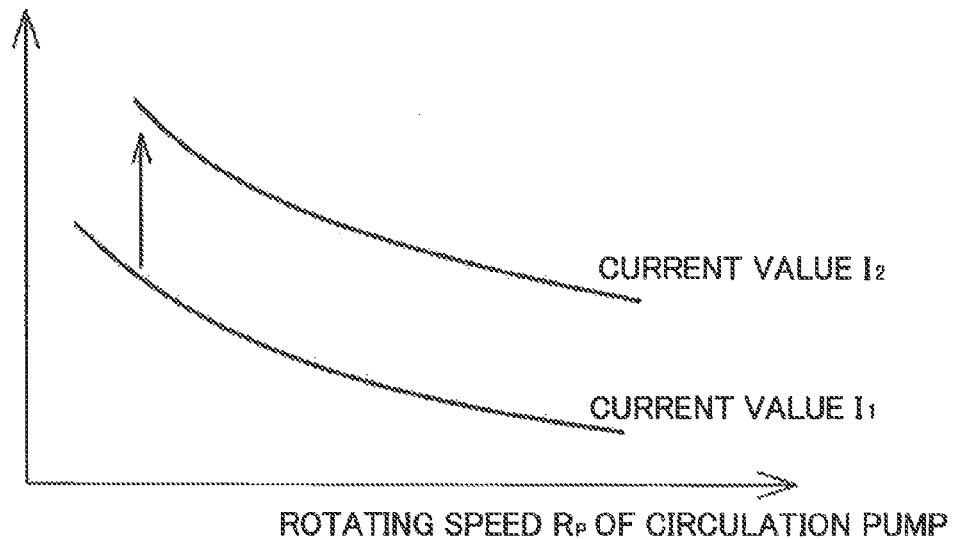
FIG. 2 is an explanatory view showing a relationship between rotating speed $R_P$ of a circulation pump and hydrogen partial pressure $P_{H2}$.

FIG. 2 is an explanatory view showing a relationship between the rotating speed $R_P$ of the circulation pump 64 and the hydrogen partial pressure $P_{H2}$. The horizontal axis of FIG. 2 represents the rotating speed $R_P$ of the circulation pump 64. The vertical axis of FIG. 2 represents the hydrogen partial pressure $P_{H2}$. Since the cross-leak level $M_L$ is proportional to the hydrogen partial pressure $P_{H2}$ as described above, the vertical axis of FIG. 2 corresponds also to the cross-leak level $M_L$. FIG. 2 shows an example of the relationship between the rotating speed $R_P$ and the hydrogen partial pressure $P_{H2}$ resulting when the current value I is $I_1$ as well as another example of the relationship between the rotating speed $R_P$ and the hydrogen partial pressure $P_{H2}$ resulting when the current value I is $I_2$ ($I_1<I_2$). The fuel cell 10 has such a relationship that given a constant current value I, the rotating speed $R_P$ and the hydrogen partial pressure $P_{H2}$ are generally inversely proportional to each other. As the reason of this, when the current value I is constant, the additional hydrogen quantity $M_C$ is also constant from above-described Equation (2). The fuel cell 10 also behaves such that the hydrogen partial pressure $P_{H2}$ increases more and more with increasing current value I. This is because the additional hydrogen quantity $M_C$ necessary for ensuring the hydrogen stoichiometric ratio C increases more and more with increasing current value I, according to foregoing Equations (1) and (2).

Figure 3:
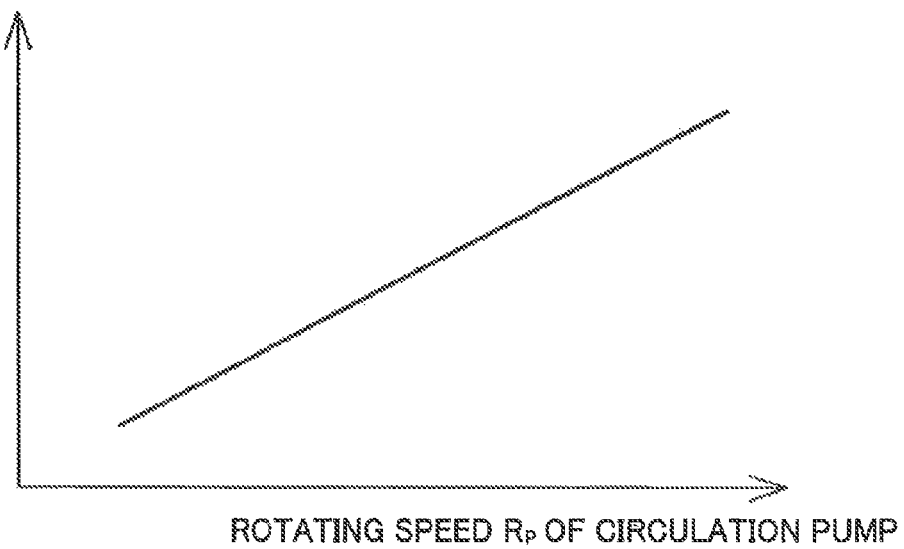
FIG. 3 is an explanatory view showing a relationship between rotating speed $R_P$ and power consumption $W_P$ of the circulation pump.

FIG. 3 is an explanatory view showing a relationship between the rotating speed $R_P$ of the circulation pump 64 and the power consumption $W_P$ of the circulation pump 64. The horizontal axis of FIG. 3 represents the rotating speed $R_P$ of the circulation pump 64. The vertical axis of FIG. 3 represents the power consumption $W_P$ of the circulation pump 64. As the rotating speed $R_P$ of the circulation pump 64 is raised to increase the circulation quantity of the anode exhaust gas, the power consumption $W_P$ of the circulation pump 64 also increases. That is, as the rotating speed $R_P$ of the circulation pump 64 is raised to decrease the cross-leak level $M_L$, loss quantity of hydrogen due to an increase in the power consumption $W_P$ increases in the meantime. Thus, the controller 20 performs control of the rotating speed $R_P$ of the circulation pump 64 and the hydrogen supply quantity by the hydrogen supply unit 55 so that hydrogen loss quantity (total hydrogen loss quantity $MT_L$) resulting from summing up the (cross-leak level $M_L$ and the hydrogen loss quantity due to an increase in the power consumption $W_P$ is suppressed. In this case, the total hydrogen loss quantity $MT_L$ can be defined, for example, as shown by following Equation (3):

$$MT_L = M_L + \beta W_P \quad (3)$$

where $\beta$ is the unit conversion factor for conversion of the power consumption $W_P$ to the hydrogen loss quantity.

Figure 4:
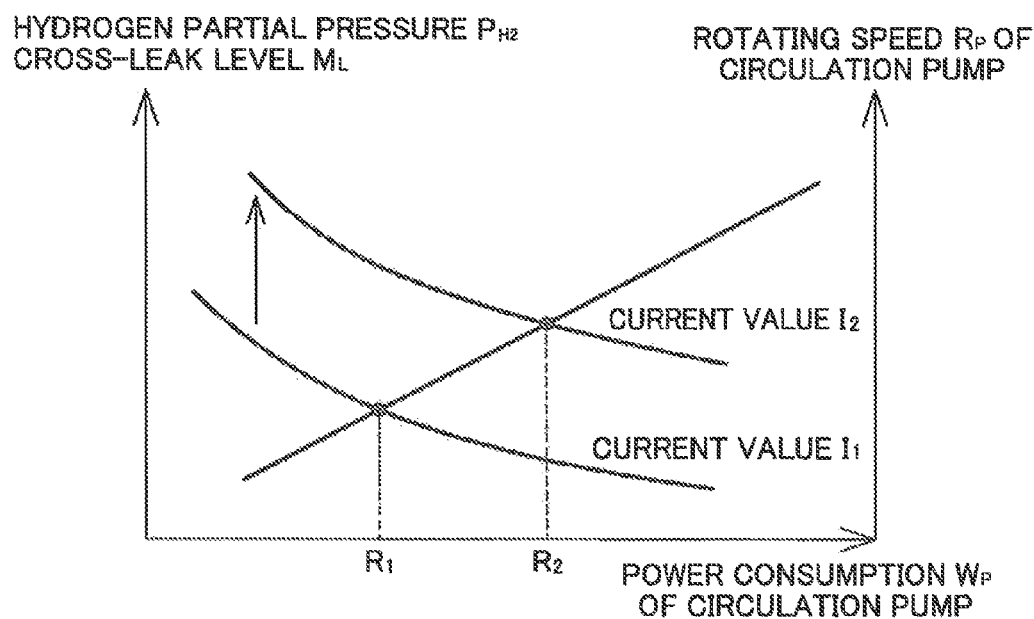
FIG. 4 is a view for explaining a relationship between current value I and an optimum rotating speed of the circulation pump.

FIG. 4 is a view for explaining a relationship between the current value I and an optimum rotating speed of the circulation pump 64. The horizontal axis of FIG. 4 represents the rotating speed $R_P$, and its vertical axis represents the hydrogen partial pressure $P_{H2}$ and the power consumption $W_P$. As in FIG. 2, FIG. 4 shows an example of the relationship between the rotating speed $R_P$ and the hydrogen partial pressure $P_{H2}$ resulting when the current value I is $I_1$ as well as another example of the relationship between the rotating speed $R_P$ and the hydrogen partial pressure $P_{H2}$ resulting when the current value I is $I_2$ ($I_1<I_2$). As in FIG. 3, FIG. 4 also shows a relationship between the rotating speed $R_P$ and the power consumption $W_P$ of the circulation pump 64. In addition to these, FIG. 4 further shows an optimum rotating speed $R_1$ when the current value I is $I_1$, and an optimum rotating speed $R_2$ ($R_1<R_2$) of the circulation pump 64 when the current value I is $I_2$. The term, optimum rotating speed, refers to a rotating speed of the circulation pump 64 at which the total hydrogen loss quantity $MT_L$ becomes a minimum. The fuel cell 10 varies in optimum rotating speed depending on the current value I. Therefore, changing the rotating speed $R_P$ so that the total hydrogen loss quantity $MT_L$ becomes as small as possible in response to the current value I makes it possible to improve the power generation efficiency. For example, when the rotating speed $R_P$ is raised from $R_1$ toward $R_2$ with the current value I increasing from $I_1$ toward $I_2$, the total hydrogen loss quantity $MT_L$ can be suppressed. Performing such control makes it possible to suppress, for example, an occurrence that raising the rotating speed $R_P$ to $R_2$ or more in spite of the current value I being as small as about $I_1$ causes the hydrogen loss quantity due to an increase in the power consumption of the circulation pump 64 to become larger than a reduction quantity of the cross-leak level so as to incur a result of a worsened power generation efficiency.

Figure 5:
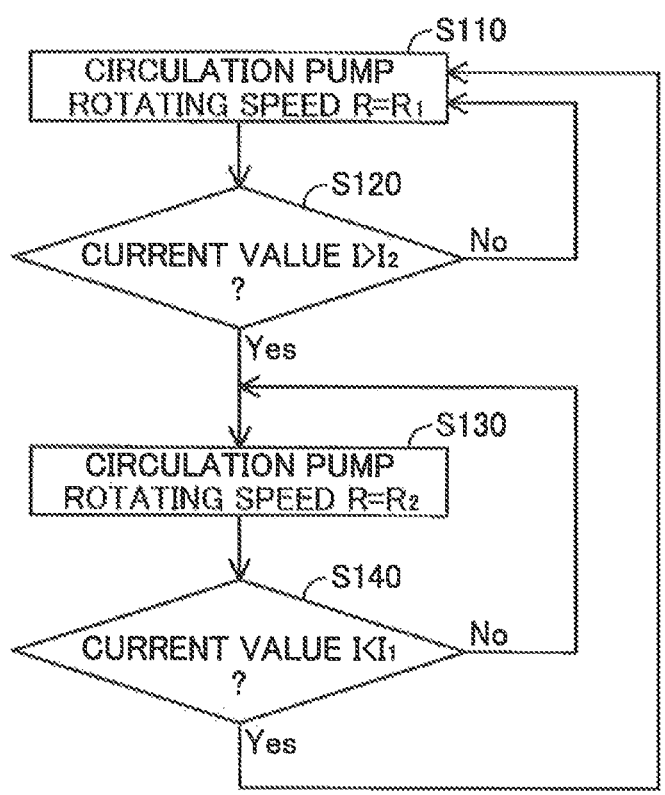
FIG. 5 is a flowchart showing a control procedure for the fuel cell system by a controller.

FIG. 5 is a flowchart showing a control procedure for the fuel cell system 100 by the controller 20. In the following description, it is assumed that set values corresponding to the current values $I_1$, $I_2$ ($I_1<I_2$) and the optimum rotating speeds $R_1$, $R_2$ ($R_1<R_2$) in FIG. 4 have been stored in the controller 20. Any arbitrary values may be set as the current values $I_1$, $I_2$. Also, it is assumed that a plurality of maps ($R_P$-$PT_{H2}$ maps) showing such relationships between rotating speed $R_P$ and hydrogen partial pressure $P_{H2}$ (in this case, replaced with "target hydrogen partial pressure $PT_{H2}$") as in FIG. 2 have been stored in correspondence to current values I of the fuel cell 10, respectively, in the controller 20.

The controller 20 starts the following operational control for an intermittent operation of the fuel cell 10. While controlling the hydrogen supply unit 55 so that the actual hydrogen partial pressure $P_{H2}$ of the anode gas flow path comes to the target hydrogen partial pressure $PT_{H2}$, the controller 20 controls the circulation pump 64 so that the rotating speed $R_P$ of the circulation pump 64 becomes $R_1$ (step S110). The value of $R_1$ is a set value previously determined as a rotating speed at which the total hydrogen loss quantity $MT_L$ becomes a minimum when the current value I is $I_1$. The hydrogen partial pressure $P_{H2}$ of the anode gas flow path can be determined, for example, from a pressure of near an outlet of the anode estimated by giving considerations of pressure loss or the like into a pressure of a pressure gauge located near an inlet of the anode. Alternatively, with the pressure gauge provided near the outlet of the anode, the hydrogen partial pressure $P_{H2}$ of the anode gas flow path may be determined from a pressure of the anode exhaust gas located near an outlet of the fuel cell 10 measured by the pressure gauge provided near the outlet.

The controller 20 holds the rotating speed $R_P$ of the circulation pump 64 remaining at $R_1$ until the current value I becomes larger than $I_2$ (step S120). The value of $I_2$, being the set value described above, is a current value at which the total hydrogen loss quantity $MT_L$ becomes a minimum when the rotating speed $R_P$ of the circulation pump 64 is $R_2$ ($R_1<R_2$). The current value I, being an actual value of an electric current flowing through the fuel cell 10, may be a current value detected by a current detector or a target current value set according to an output request from outside or the like. The current value I may also be determined from measured values based on output signals derived from various sensors or the like within the system. Furthermore, the current value I may also be derived, for example, from a target voltage value preset for high-potential avoidance and I-V characteristics of the fuel cell 10. The I-V characteristics of the fuel cell 10 may be stored beforehand in the controller 20, or may be set one by one from conditions of the fuel cell 10 including its temperature. In the case where the current value I is the target current value, the I-V characteristics may be set based on internal output requests for supplying electric power to auxiliary machines of the fuel cell system 100 or on external output requests by a user of the fuel cell system 100 such as a driver of the fuel cell vehicle.

As the current value I becomes larger than $I_2$, the controller 20 switches over the rotating speed $R_P$ of the circulation pump 64 from $R_1$ to $R_2$ ($R_1<R_2$) (step S130). Because the target hydrogen partial pressure $PT_{H2}$ is changed due to an increase in the current value I and a rise of the rotating speed $R_P$, the controller 20 controls the hydrogen supply quantity by the hydrogen supply unit 55 so that the hydrogen partial pressure $P_{H2}$ approaches a new target hydrogen partial pressure $PT_{H2}$.

Figure 6:
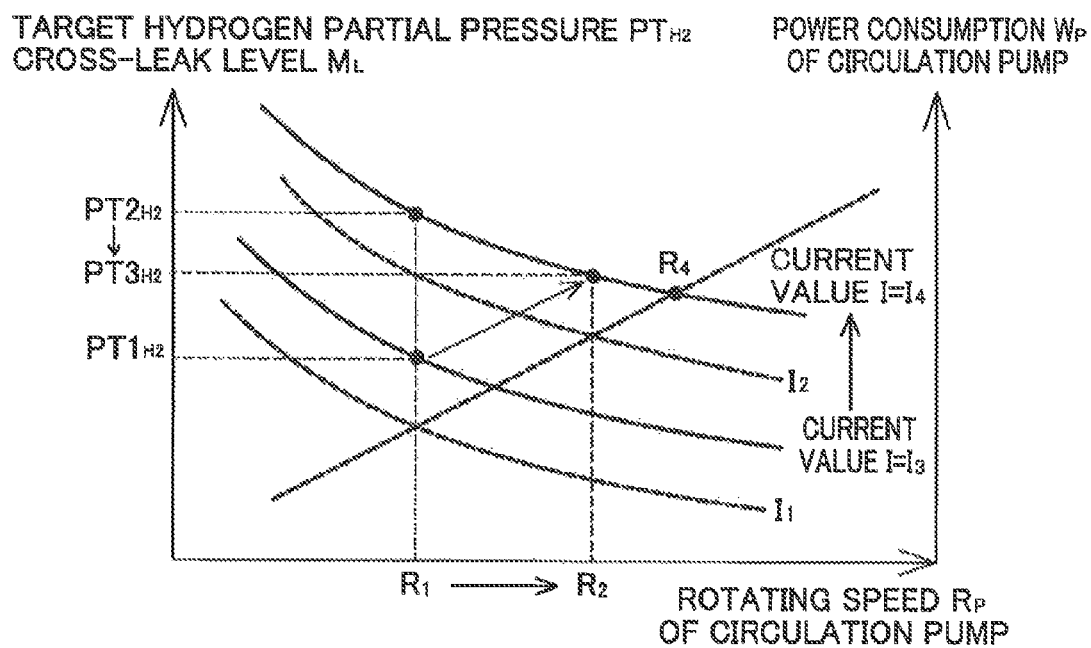
FIG. 6 is a view for explaining a target hydrogen partial pressure $PT_{H2}$.

FIG. 6 is a view for explaining the target hydrogen partial pressure $PT_{H2}$ changed due to an increase in the current value I and a rise of the rotating speed $R_P$. It is assumed here that the current value I is increased from $I_3$ to $I_4$ ($I_1<I_3<I_2<I_4$). FIG. 6 shows relationships between rotating speed $R_P$ and target hydrogen partial pressure $PT_{H2}$ at the current value $I_3$ and current value $I_4$, respectively. In the case where the rotating speed $R_P$ of the circulation pump 64 is held remaining at $R_1$ upon an increase of the current value I from $I_3$ to $I_4$, the target hydrogen partial pressure $PT_{H2}$ rises from $PT1_{H2}$ to $PT2_{H2}$. Meanwhile, in the case where the rotating speed $R_P$ of the circulation pump 64 is switched over from $R_1$ to $R_2$ upon an increase of the current value I from $I_3$ to $I_4$, the target hydrogen partial pressure comes to $PT3_{H2}$, which is lower than $PT2_{H2}$. That is, by raising the rotating speed $R_P$ of the circulation pump 64 with increasing current value I, the target hydrogen partial pressure $PT_{H2}$ can be made lower than the target hydrogen partial pressure $PT_{H2}$ in the case where the rotating speed $R_P$ is not raised.

When the rotating speed $R_P$ of the circulation pump 64 is switched over from $R_1$ to $R_2$ through the above-described processes, the total hydrogen loss quantity $MT_L$ can be reduced, as compared to the case where the rotating speed $R_P$ is held remaining at $R_1$. That is, with the current value I larger than $I_2$, the optimum rotating speed corresponding to the current value I becomes larger than $R_2$. In FIG. 6, for instance, the optimum rotating speed with the current value I equal to $I_4$ ($I_2<I_4$) is $R_4$, which is larger than $R_2$. Thus, when the rotating speed $R_P$ of the circulation pump 64 is raised up to $R_2$, rather than when the rotating speed $R_P$ is held remaining at $R_1$, the rotating speed $R_P$ becomes closer to an optimum rotating speed corresponding to the current value I so that the power generation efficiency of the fuel cell 10 is improved.

Reverting to FIG. 5, after changing the rotating speed $R_P$ to $R_2$, the controller 20 holds the rotating speed $R_P$ of the circulation pump 64 remaining at $R_2$ until the current value I becomes smaller than $I_1$ (step S140). The value of $I_1$, being the set value described above, is a current value at which the total hydrogen loss quantity $MT_L$ becomes a minimum when the rotating speed of the circulation pump 64 is $R_1$ ($R_1<R_2$). When the current value I becomes smaller than $I_1$, the controller 20 switches over the rotating speed $R_P$ of the circulation pump 64 to $R_1$ ($R_1<R_2$) (step S110). Because the target hydrogen partial pressure $PT_{H2}$ is changed due to an increase in the current value I and a rise of the rotating speed $R_P$, the controller 20 controls the hydrogen supply quantity by the hydrogen supply unit 55 so that the hydrogen partial pressure $P_{H2}$ approaches a new target hydrogen partial pressure $PT_{H2}$. As a result, the total hydrogen loss quantity $MT_L$ can be reduced, as compared to the case where the rotating speed $R_P$ of the circulation pump 64 is held remaining at $R_2$. That is, with the current value I smaller than $I_1$, the optimum rotating speed corresponding to the current value I becomes smaller than $R_1$. Thus, when the rotating speed $R_P$ of the circulation pump 64 is lowered to $R_1$ rather than when the rotating speed $R_P$ is held remaining at $R_2$, the rotating speed $R_P$ becomes closer to the optimum rotating speed corresponding to the current value I, so that the power generation efficiency of the fuel cell 10 is improved.

The controller 20 repeats the processing procedure of above-described. steps S110 to S140 until the intermittent operation status of the fuel cell 10 is canceled. In the fuel cell system 100 of this embodiment, since the rotating speed $R_P$ of the circulation pump 64 is changed so as to approach an optimum rotating speed at which the total hydrogen loss quantity $MT_L$ becomes a minimum in the intermittent operations of the fuel cell 10 as described above, the total hydrogen loss quantity $MT_L$ can be reduced to more extent, as compared with cases where such change is not made.

FIGS. 7A and 7B are views for explaining differences in control contents of the rotating speed $R_P$ between intermittent operation and normal operation of the fuel cell 10. In addition to relationships between current value I and rotating speed $R_P$ in the intermittent operation as in FIG. 4, FIG. 7A further shows a current value $I_5$ as an example in the normal operation as well as $R_5$, which is a then resulting rotating speed $R_P$. FIG. 7B shows relationships between current value I and rotating speed $R_P$ in intermittent operation and normal operation. The horizontal axis of FIG. 7B represents the current value I, and the vertical, axis represents the rotating speed $R_P$.

In the intermittent operation of the fuel cell 10, as described above, the controller 20 controls the rotating speed $R_P$ of the circulation pump 64 so that the total hydrogen loss quantity $MT_L$ becomes smaller. That is, the controller 20 controls the circulation pump 64 so that the rotating speed $R_P$ of the circulation pump 64 approaches the optimum rotating speed. Meanwhile, in the normal operation of the fuel cell 10, the controller 20 controls the circulation pump 64 so that the rotating speed $R_P$ of the circulation pump 64 is raised with increasing current value I, as shown in FIG. 7B. As a result, the rotating speed $R_P$ of the circulation pump 64 become smaller than the optimum rotating speed in the normal operation of the fuel cell 10. In the normal operation of the fuel cell 10, the controller 20 does not perform such control of the circulation pump 64 that the rotating speed $R_P$ of the circulation pump 64 approaches the optimum rotating speed. This is because the anode exhaust gas generally contains impurities so that an increased ratio of the anode exhaust gas might make it impossible to obtain a hydrogen quantity necessary for power generation, giving rise to a need for increasing the ratio of hydrogen of less impurities supplied from the injector for the normal operation. As another reason, since hydrogen supplied to the anode is consumed fast by the power generation in the normal operation, the cross-leak is less likely to matter.

According to the fuel cell system 100 of this embodiment described hereinabove, the controller 20 controls the circulation pump 64 so that the rotating speed $R_P$ of the circulation pump 64 approaches the optimum rotating speed. As a result of this, hydrogen less quantity corresponding to the power consumption $W_P$ required for driving the circulation pump 64 to reduce the cross-leak level $M_L$ can be suppressed while the reduction of the cross-leak level $M_L$ is fulfilled. That is, by raising the rotating speed of the circulation pump 64 to increase the circulation quantity of the anode exhaust gas, the hydrogen partial pressure $P_{H2}$ of the anode gas flow path of the fuel cell 10 is lowered to reduce the cross-leak level $M_L$ while a hydrogen stoichiometric ratio C necessary for generation of a target current value is ensured. On the other hand, by preventing excessive rise in the rotating speed $R_P$ of the circulation pump 64, the hydrogen loss quantity corresponding to the power consumption $W_P$ required for driving the circulation pump to reduce the cross-leak level $M_L$ can be suppressed. Thus, the power generation efficiency of the fuel cell can be improved.

Modifications:

In addition, the present invention, not being limited to the above-described embodiments and examples, can be implemented in various aspects without departing from the gist of the invention. For example, part or entirety of the functions and processes implemented by software in the foregoing embodiment may be implemented by hardware. Also, part or entirety of the functions and processes implemented by hardware may be implemented by software. As the hardware, for example, various types of circuitry such as integrated circuits, discrete circuits or circuit modules in combination of those circuits may be used. Further, such modifications as described below are implementable.

Modification 1:

In the first embodiment, the controller 20 switches over the rotating speed $R_P$ of the circulation pump 64 to either $R_1$ or $R_2$. However, the controller 20 may be so constituted that an optimum rotating speed is determined in response to the current value I and then the rotating speed $R_P$ of the circulation pump 64 is changed to the determined optimum rotating speed. For example, it is assumed that optimum rotating speeds and target hydrogen partial pressures $PT_{H2}$ for individual current values I of the fuel cell 10 have been stored in the controller 20 beforehand. In this case, the controller 20 is enabled to determine an optimum rotating speed and a target hydrogen partial pressure $PT_{H2}$ from the current value I. It is also assumed, for example, that $R_P$-$PT_{H2}$ maps for individual current values I of the fuel cell 10 as well as a map ($R_P$-$W_P$ map) showing the relationship between rotating speed $R_P$ and power consumption $W_P$ shown in FIG. 3 have been stored in the controller 20. In this case, the controller 20 is enabled to determine the cross-leak level $M_L$ at each rotating speed $R_P$ from the $R_P$-$PT_{H2}$ maps and to determine the power consumption $W_P$ at each rotating speed $R_P$ from the $R_P$-$W_P$ map. Applying a combination of a cross-leak level and a power consumption $W_P$, which is determined for each rotating speed $R_P$, to the above-described Equation (3) makes it possible to determine an optimum rotating speed at which the total hydrogen loss quantity $MT_L$ becomes a minimum. Also with this constitution, it is achievable to reduce the loss of hydrogen and improve the power generation efficiency.

Modification 2:

In the foregoing embodiment, it is described that the operational control of FIG. 5 is to be executed in the intermittent operation of the fuel cell 10. However, the operational control of FIG. 5 may be executed also in a status other than the intermittent operation of the fuel cell 10. In this case also, it is achievable to reduce the loss of hydrogen and improve the power generation efficiency.

What is claimed is:

1. A fuel cell system comprising:
a fuel cell containing a unit cell With an anode and a cathode included therein;
a hydrogen supply unit that supplies hydrogen gas to the anode;
a circulation pump that supplies an anode exhaust gas containing hydrogen that has not been used for power generation by the fuel cell and is discharged from the anode, once again to the anode to circulate the anode exhaust gas; and
a controller that controls supply quantity of the hydrogen gas by the hydrogen supply unit as well as rotating speed of the circulation pump, wherein
in intermittent operation of the fuel cell, the controller drives the circulation pump so that the rotating speed of the circulation pump approaches an optimum rotating speed of the circulation pump at which a total hydrogen loss quantity becomes a minimum under a specified current value, the total hydrogen loss quantity being a sum of a hydrogen quantity corresponding to an electric power necessary for driving the circulation pump and a hydrogen quantity passing from anode side to cathode side of the fuel cell, wherein
the controller
stores settings for respectively realizing optimum rotating speeds corresponding to two target current values,
in intermittent operation,
in case where the current value increases and becomes larger than a larger target current value of the two target current values, regulates the circulation pump with a setting for realizing an optimum rotating speed corresponding to the larger target current value,
in case where the current value decreases and becomes smaller than a smaller target current value of the two target current values, regulates the circulation pump with a setting for realizing an optimum rotating speed corresponding to the smaller target current value, and
in case where the current value decreases and becomes smaller than the larger target current value and in case where the current value increases and becomes larger than the smaller target current value, regulates the circulation pump with setting same as the setting being used by then.

2. The fuel cell system in accordance with claim 1, wherein
the controller:
switches over between normal operation and intermittent operation of the fuel cell;
drives the circulation pump at a rotating speed smaller than an optimum rotating speed at which the total hydrogen loss quantity becomes a minimum in the normal operation of the fuel cell; and
drives the circulation pump so that the rotating speed of the circulation pump approaches the optimum rotating speed at which the total hydrogen loss quantity becomes a minimum under a specified current value in the intermittent operation of the fuel cell.

3. A fuel cell system control method comprising the steps of:
(a) increasing supply quantity of hydrogen gas with increasing current obtained from a fuel cell in normal operation of the fuel cell; and
(b) increasing a flow rate of an anode exhaust gas which is discharged from an anode of the fuel cell so as to be supplied again to the anode as an electric current obtained from the fuel cell increases in intermittent operation of the fuel cell so that a hydrogen partial pressure of the anode is made lower than a hydrogen partial pressure necessary for generating the current in intermittent operation of the fuel cell,
wherein the step (b) includes:
based on settings for respectively realizing optimum rotating speeds corresponding to two target current values,
in case where the current value increases and becomes larger than a larger target current value of the two target current values, regulating the circulation pump with a setting for realizing an optimum rotating speed corresponding to the larger target current value, in case where the current value decreases and becomes smaller than a smaller target current value of the two target current values, regulating the circulation pump with a setting for realizing an optimum rotating speed corresponding to the smaller target current value, and in case where the current value decreases and becomes smaller than the larger target current value and in case where the current value increases and becomes larger than the smaller target, current value, regulating the circulation pump with setting same as the setting being used by then.

4. The control method in accordance with claim 3, wherein in the step (b), the anode exhaust gas is supplied to the anode by a circulation pump, the circulation pump is driven so that rotating speed of the circulation pump approaches an optimum rotating speed of the circulation pump at which a total hydrogen loss quantity becomes a minimum under a specified current value, the total hydrogen loss quantity being a sum of a hydrogen quantity corresponding to an electric power necessary for driving the circulation pump that circulates the anode exhaust gas and a hydrogen quantity passing from anode side to cathode side of the fuel cell, whereby the flow rate of the anode exhaust gas is increased and moreover the hydrogen partial pressure of the anode is lowered.

5. The control method in accordance with claim 4, further comprising:

in the step (a), driving the circulation pump at a rotating speed smaller than an optimum rotating speed at which the total hydrogen loss quantity becomes a minimum; and in the step (b), driving the circulation pump so that the rotating speed of the circulation pump approaches the optimum rotating speed at which the total hydrogen loss quantity becomes a minimum under a specified current value.

* * * * *